(12) United States Patent
Kasai

(10) Patent No.: US 8,464,552 B2
(45) Date of Patent: Jun. 18, 2013

(54) PRODUCTION OF A SELF-SUPPORTING GLASS FILM

(75) Inventor: Toshihiro Kasai, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 487 days.

(21) Appl. No.: 12/282,567

(22) PCT Filed: Mar. 26, 2007

(86) PCT No.: PCT/US2007/064930
§ 371 (c)(1),
(2), (4) Date: Sep. 11, 2008

(87) PCT Pub. No.: WO2007/112351
PCT Pub. Date: Oct. 4, 2007

(65) Prior Publication Data
US 2009/0098997 A1    Apr. 16, 2009

(30) Foreign Application Priority Data

Mar. 27, 2006    (JP) ................................ 2006-086086

(51) Int. Cl.
*C03B 8/00*    (2006.01)
(52) U.S. Cl.
USPC ........................................... 65/17.2; 65/17.1
(58) Field of Classification Search
USPC ................................ 65/17.1, 17.2
See application file for complete search history.

(56) References Cited

U.S. PATENT DOCUMENTS

| | | | | |
|---|---|---|---|---|
| 4,057,525 A | * | 11/1977 | Kikuchi et al. | ........... 524/386 |
| 4,806,665 A | * | 2/1989 | Jones et al. | ........... 556/413 |
| 5,221,497 A | * | 6/1993 | Watanabe et al. | ........... 516/83 |
| 5,693,260 A | | 12/1997 | Von Bonin et al. | |
| 5,849,375 A | | 12/1998 | Smith et al. | |
| 5,858,280 A | * | 1/1999 | Zhang et al. | ........... 516/104 |
| 5,885,713 A | | 3/1999 | von Bonin | |
| 6,017,389 A | | 1/2000 | Schmidt et al. | |
| 6,221,942 B1 | | 4/2001 | Boakye et al. | |
| 6,682,598 B1 | | 1/2004 | Steinmueller et al. | |
| 7,064,094 B2 | | 6/2006 | Harada et al. | |
| 2003/0213266 A1 | * | 11/2003 | Ganguli | ........... 65/17.2 |
| 2006/0112855 A1 | | 6/2006 | Andersson et al. | |
| 2006/0204655 A1 | | 9/2006 | Takahashi | |
| 2007/0128447 A1 | | 6/2007 | Hazel | |
| 2009/0061195 A1 | | 3/2009 | Kasai | |
| 2009/0090134 A1 | | 4/2009 | Kasai | |
| 2010/0147026 A1 | | 6/2010 | Kasai | |
| 2010/0189993 A1 | | 7/2010 | Mori et al. | |

FOREIGN PATENT DOCUMENTS

| | | |
|---|---|---|
| EP | 1705027 | 9/2006 |
| GB | 2077254 | 12/1981 |
| JP | 57077036 | 5/1982 |
| JP | 61083648 | 4/1986 |
| JP | 61-236619 | 10/1986 |
| JP | 04-154638 | 5/1992 |
| JP | 04154638 A * | 5/1992 |
| JP | 4-292425 | 10/1992 |
| JP | 08-290928 | 11/1996 |
| JP | 11-139837 | 5/1999 |
| JP | 2004-284843 | 10/2004 |

OTHER PUBLICATIONS

Translation of JP 04-154638, Andou, Kuniko; Method for Producing Thin Plate-like Silica Glass; May 27, 1992.*
"Solgelhou no Kagaku [Sol-Gel Science]", Sakka S., Agune Shofu Publishing.
"Colloidal Silica: Colloidal silicas are suspensions of fine sized amorphous, nonporous, and typically spherical silica particles in a liquid phase", W. R. Grace & Co.-Conn., Columbia, Maryland, USA [online], [retrieved from the internet on Sep. 12, 2011], URL http://www.grace.com/engineeredmaterials/materialsciences/colloidalsilica/default.aspx, 1 pg.
Kairong, "Low Temperature Synthesis of Transparent Silica Glass Fibers, Films and Bulk Silica Glasses by the Sol-Gel Method", Opto-Electronic Engineering, Dec. 31, 1984, vol. 3, pp. 9-15.

* cited by examiner

*Primary Examiner* — Queenie Dehghan
(74) *Attorney, Agent, or Firm* — Jean A. Lown

(57) ABSTRACT

A process for the production of a self-supporting glass film is described. The method includes the steps of preparing a mixture containing a colloidal silica sol, at least one alkanolamine organic additive and an organic binder; coating the mixture onto a base material; drying the coated mixture to form a precursor film on the base material; releasing the precursor film from the base material; and firing the released precursor film to form a self-supporting glass film. Self-supporting glass films produced by the disclosed process are also described.

8 Claims, No Drawings

PRODUCTION OF A SELF-SUPPORTING GLASS FILM

CROSS REFERENCE TO RELATED APPLICATIONS

This application is a national stage filing under 35 U.S.C. 371 of PCT/US2007/112351, filed Mar. 26, 2007, which claims priority to Japanese Application No. 2006-086086, filed Mar. 27, 2006, the disclosure of which is incorporated by reference in its/their entirety herein.

FIELD

A self-supporting glass film is described as well as a sol-gel process for the production of the self-supporting glass film.

BACKGROUND

Normal sol-gel processes utilize a metal oxide or hydroxide sol that is obtained from an inorganic compound solution, an organic metal compound solution of a metal alkoxide, or a similar compound. The sol is then gelled, and the gel is heated to produce a ceramic or glass.

Silica ($SiO_2$) glass production processes using sol-gel processes are known. Numerous examples are described by S. Sakka in the book *Sol Gel Science*, which was published by Agune Shofu Publishing. Most sol-gel processes are for the production of films less than 1 μm (micrometer) thick and use a metal alkoxide solution for integral formation on a base such as glass or a conductor. Although bulk type $SiO_2$ glass formed using a sol-gel process have been prepared separately and independently of a base, special drying machines (e.g., drying machines for supercritical drying) have been used to prevent the occurrences of cracks during the drying step. If the special drying equipment is not utilized, the drying must be carried out very slowly. For example, Japanese Unexamined Patent Publication SHO No. 61-236619 describes a production process for quartz glass using a sol-gel process. The drying method involves maintaining the film overnight at 20° C. and then using a container cover with a prescribed opening ratio for drying at 60° C. for 10 days. Similarly, Japanese Unexamined Patent Publication HEI No. 4-292425 describes a production process for silica glass using a sol-gel process. The starting sol is placed in a dish, gelled at room temperature, and then the cover of the dish is replaced with one containing holes for drying at 60° C. for 100 days. Such prolonged drying is considered a major obstacle for production via these methods.

Furthermore, bulk type $SiO_2$ glass produced by conventional sol-gel processes generally have a thickness of several tens of millimeters or greater. Methods for producing self-supporting glass films are therefore of interest.

SUMMARY

A self-supporting glass film and a sol-gel process for making the self-supporting film are described. The sol-gel process requires no prolonged drying and typically results in the formation of crack-free self-supporting glass films.

The process for production of a self-supporting glass film includes the steps of preparing a mixture containing (a) a colloidal silica sol, (b) at least one alkanolamine organic additive, and (c) an organic binder; applying the mixture onto a base material to form a coating; drying the coating on the base material to form a precursor film on the base material; releasing the precursor film from the base material; and firing the released precursor film to form a self-supporting glass film.

DETAILED DESCRIPTION

As used herein, a "self-supporting glass film" refers to a self-supporting thin film-like glass that requires no support. The thickness of the self-supporting glass film is typically no greater than about 2 millimeters (mm).

Self-supporting glass films produced as discussed herein can have enhanced weather resistance, heat resistance, corrosion resistance, or a combination thereof. Because the films are self-supporting, they can be more flexible than a panel and can be used for attachment to different types of substrates such as plastic films, for example.

According to this production process, a colloidal silica sol, an alkanolamine organic additive, and an organic binder are combined to form a mixture. The mixture is then applied onto a base material to form a coating. The coating in then dried to form a precursor film. The precursor film is then released from the base material and fired to obtain a self-supporting glass film.

The mixture, as utilized herein, is prepared by combining a colloidal silica sol, at least one alkanolamine organic additive and an organic binder. The order and/or method of combination of the ingredients are not generally important, and one of ordinary skill in the art could utilize any known method to prepare the mixture.

Colloidal Silica Sol

Colloidal silica sols having silica fine particles dispersed stably in a dispersing medium can generally be utilized. Any kind of dispersing media typically used by one of skill in the art can be utilized herein. In some embodiments, water may be used as the dispersing medium to produce an aqueous silica sol. In other embodiments, the dispersing medium contains water and a water-miscible organic solvent.

The average particle size of the silica fine particles in the silica sol is generally not greater than about 300 nm (nanometers). In another embodiment, the average particle size of the silica fine particles in the silica sol is generally not greater than about 100 nm. In yet another embodiment, the average particle size of the silica fine particles in the silica sol is generally not greater than about 50 nm.

A sol with excessively large silica fine particles can hamper formation of a transparent film. Furthermore, excessively large particle sizes may reduce the dispersion stability and result in non-uniformity in the film. Particle sizes that are excessively large are also generally not utilized because the gaps between the particles will become so large that a higher firing temperature for densification of the film may be required. On the other hand, the average particle size is generally at least about 4 nm. In another embodiment, the average particle size is at least about 8 nm. If the particle size is too small, cracks in the film can occur more easily.

Some colloidal silica sols that are utilized include sodium. The sodium concentration of the colloidal silica sol can differ depending on the particular sol that is utilized. Concentrations of sodium that are excessively high can yield a brittle, non-transparent film. In one embodiment a low sodium acidic silica sol can be utilized. In another embodiment at least some of the sodium can be removed with an ion-exchange resin, or the like, in order to lower the sodium concentration to less than or equal to about 500 ppm.

Alkanolamine Organic Additive

The mixture used in the process for production of the self-supporting film includes an alkanolamine as an organic additive. It is believed, but not relied upon, that addition of an alkanolamine can inhibit cracking during drying of the coating.

In one embodiment, alkanolamines such as triethanolamine, diethanolamine, and monoethanolamine may be utilized as the alkanolamine organic additive. Alkanolamine organic additives may be used alone or in combinations of two or more. In one embodiment, the alkanolamine organic additive is not greater than about 100% by weight with respect to the inorganic solid content of silica. In another embodiment, the alkanolamine organic additive is not greater than about 80% by weight with respect to the inorganic solid content of silica. In yet another embodiment, the alkanolamine organic additive is not greater than about 50% by weight with respect to the inorganic solid content of silica. If the amount of alkanolamine organic additive is too great, drying of the film can be notably delayed.

In one embodiment, the alkanolamine organic additive is at least about 2% by weight with respect to the inorganic solid content of silica. In another embodiment, the alkanolamine organic additive is at least about 5% by weight with respect to the inorganic solid content of silica. In yet another embodiment, the alkanolamine organic additive is at least about 10% by weight with respect to the inorganic solid content of silica. If the amount of alkanolamine organic additive is too small cracks may occur in the dried films. In one embodiment, the alkanolamine organic additive is used at about 2 to about 100% by weight with respect to the inorganic solid content of silica.

Organic Binder

The colloidal silica sol is combined with the alkanolamine organic additive and an organic binder. Generally, organic binders that can be utilized include, but are not limited to, acrylic aqueous emulsions and polyurethane aqueous emulsions. Addition of a large amount of organic binder tends to improve the strength of the precursor film (i.e. the film before firing), but can also result in significant shrinkage during the firing step. Significant shrinkage can be accompanied with the formation of cracks in the film. A large amount of organic binder can also increase the production cost. In one embodiment, therefore, a low amount of organic binder is typically added. In one embodiment, the amount of organic binder added is not greater than about 100% by weight with respect to the inorganic solid content of silica. In another embodiment, the amount of organic binder added is not greater than about 80% by weight with respect to the inorganic solid content of silica. In another embodiment, the amount of organic binder added is not greater than about 50% by weight with respect to the inorganic solid content of silica. If too little organic binder is utilized, the precursor film may have insufficient strength. This can make the precursor films susceptible to tearing during the release step from the base material prior to firing. In one embodiment, the amount of organic binder is at least about 3% or more by weight with respect to the inorganic solid content of silica. In one embodiment, the amount of organic binder is at least about 5% or more by weight with respect to the inorganic solid content of silica. In one embodiment, the amount of organic binder is at least about 8% or more by weight with respect to the inorganic solid content of silica.

Optional Additives

Additives may optionally be included in the mixture comprising the (a) colloidal silica sol, (b) alkanolamine organic additive, and (c) organic binder. Exemplary optional additives include, but are not limited to, compounds that are miscible with water and that have a boiling point of 100° C. or higher. Such exemplary compounds can include lactic acid, γ-butyrolactone, and glycerin.

Process Steps

After a mixture has been prepared, for example, by combining the colloidal silica sol, organic binder, alkanolamine organic additive and optional additives, the mixture is then applied onto a base material to form a coating. The coating can then be dried to form a precursor film.

The base material can include any base material generally utilized by those of skill in the art. Exemplary base materials include plastic films including, but not limited to, polyester films such as polyethylene terephthalate (PET), acrylic films such as polymethyl methacrylate (PMMA), polycarbonates, and polyimides; glass; ceramic; and metal. The base material may optionally be subjected to release treatments such as silicone treatment in order to facilitate release of the film after drying. In an embodiment where a relatively thin film is to be formed, often a base material will be used without release treatment in order to avoid impairing the film-forming properties of the mixture.

The method used for applying the mixture onto the base material can be any coating method commonly utilized by one of skill in the art, including, but not limited to, die coating, spray coating, bar coating, knife coating, casting, and printing methods such as screen printing.

In one embodiment, the coating is dried at room temperature (i.e., about 20° C. to 30° C.). In another embodiment, the coated mixture is dried by heating. The drying may be performed either at atmospheric pressure or under reduced pressure. Several hours of drying may be sufficient even if the drying is carried out at atmospheric pressure and room temperature. The drying step yields a dried coating layer, which is referred to herein as the precursor film.

After drying, the precursor film is typically released from the base material. The precursor film can be released from the base material by methods commonly utilized by those of skill in the art. The released film is then fired. In one embodiment, pre-firing steps can be carried out on the precursor film. Such pre-firing steps include, but are not limited to, cutting the precursor film to a desired size.

If the precursor film is not released before firing, the heat of the firing step can produce stress due to the difference in thermal expansion coefficients of the base material and the precursor film. This stress can create cracks. Also, when the precursor film is released before firing it is possible to select a base material without regard to its firing temperature. This allows the use of a flexible base material such as a resin film, for example, as the base material. Using a flexible base material can reduce stress on the precursor film when it is released from the base material.

An electric furnace or other similar devices known to those of skill in the art may be used for firing. In one embodiment, staged heating (i.e., multiple stages of heating) can be utilized. In an initial stage, the temperature is raised slowly at a heating rate of, for example, about 5° C./min. In another embodiment, a heating rate of about 3° C./min can be utilized in the initial stage. In yet another embedment, a heating rate of about 1° C./min can be utilized in the initial stage. The initial stage can continue until the organic material (e.g., organic binder and alkanolamine) reaches its burnout temperature (about 450° C. to 500° C.). The burnout temperature refers to the temperature where the organic material decomposes and/or is converted to volatile materials. After the initial stage, the temperature is increased at a higher heating rate of, for example, about 5° C./min to 10° C./min, up to the final firing temperature. The self-supporting glass film can be formed by firing for 15 minutes or longer at the firing temperature. The firing temperature will generally be about 700° C. to 1500° C. Depending on the particle size of the silica sol used, a firing temperature of greater than 1000° C. may be needed to produce films that are dense and transparent. In some embodiments, the firing temperature is 1100° C. or higher to obtain a dense glass film that can be transparent. For example, the firing temperature can be in the range greater than 1000° C. to 1500° C. or 1100° C. to 1500° C.

In the processes that are utilized, the inclusion of an alkanolamine organic additive in the silica sol mixture allows drying of the coated solution to be carried out in a relatively short time, while also preventing cracks in the precursor film during the drying step. It is therefore possible to form not only thin films but also relatively thick films. The production processes, as described herein can yield films having a thickness from about 5 µm to about 2 mm. The films are often no greater than 1.5 mm, no greater than 1.2 mm, no greater than 1 mm, or no greater than 0.8 mm.

Self-supporting glass films formed herein may be attached to any substrate, including, but not limited to, plastic films, metal, wood, concrete, or ceramic. Adding a glass film produced as disclosed herein can increase the heat resistance of the substrate, improve the scratch resistance of the substrate, improve the chemical resistance of the substrate, or combinations thereof. In one embodiment, gas barrier properties of the substrate can be enhanced if a densified film is produced by forming the glass film under the prescribed firing conditions. In another embodiment, heat insulating properties can be provided to the substrate if the glass film is formed without thorough densification.

In some embodiment, glass films may be used by attaching them to plastic films. Such articles can be used, for example, in display devices such as plasma display panels (PDP) or liquid crystal display panels (LCP). Additionally, such articles can be used be used as lightweight structural materials for windows and the like.

EXAMPLES

The disclosure is described below by referring to Examples, but the disclosure is of course not limited by these Examples.

Example 1

0.9 grams of 2-aminoethanol (Wako Pure Chemical Industries Co., Ltd.) was dissolved in 15 grams of aqueous colloidal silica sol (Snowtex ST-OL from Nissan Chemical Co., Ltd.—particle size: 40-50 nm, solid content: 20.5 wt %).

1.2 grams of aqueous acrylic emulsion AE986A (JSR Corp.—solid content: 35 wt %) was added to prepare a mixture. The organic binder content with respect to weight of inorganic solid content of silica was 13.66 wt % and the 2-aminoethanol content with respect to weight of inorganic solid content of silica was 29.27 wt %.

The mixture was cast onto a silicone-treated polyethylene terephthalate (PET) film (Toray Corp.—SP PET-01-25BU) and dried at room temperature overnight. The dried precursor film was released from the PET film and fired on an alumina base in an electric furnace. The firing was performed by slowly raising the temperature from room temperature to 500° C. over a period of 3 hours (the heating rate was 2.65° C./min) to remove the organic binder. The temperature was then raised to 1400° C. over a period of one hour (the heating rate was 15° C./min) and firing was continued for about 15 minutes at 1400° C. A transparent self-supporting glass film was obtained. X-ray diffraction (XRD) analysis of the transparent glass film confirmed that it was amorphous. The thickness of the glass film was confirmed by caliper measurement to be 0.6 mm.

Examples 2-5

Self-supporting glass films were produced according to Example 1, except that the organic binder amount was changed as shown in Table 1 below. The thicknesses of each of the glass films produced in the examples are shown in Table 1. The colloidal silica sol used in Examples 1-5 was Snowtex ST-OL (particle size: 40-50 nm).

TABLE 1

| Example No. | Organic binder weight (grams) | Alkanolamine content with respect to silica (wt %) | Organic binder content with respect to silica (wt %) | Post-firing appearance | Thickness (mm) |
| --- | --- | --- | --- | --- | --- |
| 1 | 1.2 | 29.27 | 13.66 | transparent film | 0.6 |
| 2 | 2.4 | 29.27 | 27.3 | transparent film | 0.6 |
| 3 | 1.8 | 29.27 | 20.5 | transparent film | 0.8 |
| 4 | 0.9 | 29.27 | 10.3 | transparent film | 0.6 |
| 5 | 0.6 | 29.27 | 6.8 | transparent film | 0.5 |

As shown in Table 1, firing yielded a transparent amorphous self-supporting glass film in each example.

Example 6

A self-supporting glass film was produced according to Example 1 with the exception that Snowtex ST-O (Nissan Chemical Co., Ltd.—particle size: 10-20 nm, solid content: 20.5 wt %) was used instead of Snowtex ST-OL. The organic binder content with respect to the weight of inorganic solid content of silica was 54.63 wt %. The 2-aminoethanol content with respect to the weight of the inorganic solid content of silica was 29.27 wt %. The film was dried and then fired at 1200° C. for 15 minutes to yield a self-supporting glass transparent film. XRD analysis revealed that the fired transparent glass film was amorphous. The thickness of the glass film was 0.5 mm.

Examples 7-10

Self-supporting films were produced according to Example 6, except that the amount of organic binder was changed as shown in Table 2. The colloidal silica sol used in Examples 71-10 was Snowtex ST-O with a particle size of 10-20 nm. Each of the dried films was fired at 1300° C. for 15 minutes, resulting in a transparent self-supporting glass film. XRD analysis revealed that the fired transparent films were all amorphous. The thicknesses of each of the glass films produced in the examples are shown in Table 2.

Comparative Example

A self-supporting film according to Example 6 was prepared with the exception that 2-aminoethanol as an alkanolamine organic additive was not added. Numerous cracks occurred in the film during the drying step.

TABLE 2

| Example No. | Organic binder weight (grams) | Alkanolamine content with respect to silica (wt %) | Organic binder content with respect to silica (wt %) | Post-firing appearance | Thickness (mm) |
|---|---|---|---|---|---|
| 6 | 4.8 | 29.27 | 54.63 | transparent film | 0.5 |
| 7 | 3 | 29.27 | 34.1 | transparent film | 0.8 |
| 8 | 2.4 | 29.27 | 27.3 | transparent film | 0.6 |
| 9 | 1.8 | 29.27 | 20.5 | transparent film | 0.7 |
| 10 | 1.2 | 29.27 | 13.6 | transparent film | 0.7 |
| Comp. Example | 4.8 | — | 54.63 | cracking | 0.5 |

Example 11

A self-supporting glass film was produced similar to Example 1. However, instead of AE986A, the organic binder was the aqueous polyurethane emulsion RESAMINE D6060 KAI3 (Dainichiseika Co., Ltd., solid content: 35%). The organic binder content with respect to the weight of inorganic solid content of silica was 54.63 wt %. The 2-aminoethanol content with respect to the weight of inorganic solid content of silica was 29.27 wt %. The final fired film produced from this example was also transparent.

Examples 12-18

Self-supporting films were produced similar to Example 6, except that the firing temperature was changed as shown in Table 3.

The types of silica sols used in Examples 12-18 are also shown in Table 3. Although self-supporting films were obtained in all cases, it was necessary to set the firing temperature above 1000° C. to obtain the transparent films.

TABLE 3

| Example No. | Silica sol used | Firing temperature | Film appearance | Thickness (mm) |
|---|---|---|---|---|
| 12 | ST-O | 1200° C. | transparent film | 0.5 |
| 13 | ST-O | 1300° C. | transparent film | 0.6 |
| 14 | ST-O | 1400° C. | transparent film | 0.5 |
| 15 | ST-OL | 1350° C. | transparent film | 0.5 |
| 16 | ST-O | 800° C. | white film | 0.8 |
| 17 | ST-O | 1000° C. | white film | 0.7 |
| 18 | ST-OL | 1000° C. | white film | 0.7 |

Examples 19-27

Self-supporting films were produced similar to Example 6. The alkanolamine organic additive was selected from triethanolamine, diethanolamine, or monoethanolamine (2-aminoethanol). The amount of alkanolamine organic additive was also changed as shown in Table 4. The results are shown in Table 4.

TABLE 4

| Example No. | Alkanolamine | Alkanolamine content with respect to silica (wt %) | Condition of dry film | Appearance after firing at 1250° C. | Thickness (mm) |
|---|---|---|---|---|---|
| 19 | triethanolamine | 40 | no cracks | transparent film | 0.6 |
| 20 | triethanolamine | 50 | no cracks | transparent film | 0.7 |
| 21 | triethanolamine | 60 | no cracks | transparent film | 0.6 |
| 22 | diethanolamine | 40 | no cracks | transparent film | 0.7 |
| 23 | diethanolamine | 50 | no cracks | transparent film | 0.5 |
| 24 | diethanolamine | 60 | no cracks | transparent film | 0.5 |
| 25 | monoethanolamine | 40 | no cracks | transparent film | 0.6 |
| 26 | monoethanolamine | 50 | no cracks | transparent film | 0.6 |
| 27 | monoethanolamine | 60 | no cracks | transparent film | 0.7 |

The invention claimed is:

1. A process for production of a self-supporting glass film, the process comprising the steps of:
preparing a mixture, wherein the mixture comprises (a) a colloidal silica sol, wherein the colloidal silica is the only source of silicon in the mixture, (b) at least one alkanolamine organic additive in an amount equal to at least 10 wt % with respect to the inorganic solid content of silica in the mixture, and (c) an organic binder;
applying the mixture onto a base material to form a coating;
drying the coating to form a precursor film on the base material, wherein the precursor film is crack-free;
releasing the precursor film from the base material; and
firing the released precursor film to form a self-supporting glass film that is crack-free.

2. A process according to claim 1, wherein the colloidal silica sol is an aqueous sol.

3. A process according to claim 1, wherein the alkanolamine organic additive is triethanolamine, diethanolamine, monoethanolamine, or a combination thereof.

4. A process according to claim 1, wherein the organic binder is an aqueous acrylic emulsion or an aqueous polyurethane emulsion.

5. A process according to claim 1, wherein the amount of the organic binder is from about 5 to about 100 wt % with respect to the inorganic solid content of silica in the mixture.

6. A process according to claim 1, wherein the colloidal silica sol has particles that have a size that is less than or equal to about 300 nm.

7. A process according to claim 1, wherein the thickness of the self-supporting glass film is not greater than about 2 mm.

8. A process according to claim 1, wherein the firing step is carried out at a temperature that is greater than 1000° C.

* * * * *